(12) United States Patent
Warren (10) Patent No.: US 10,177,584 B2
(45) Date of Patent: Jan. 8, 2019

(54) ELECTRICAL CHARGING DEVICES AND ASSEMBLIES

(71) Applicant: William J. Warren, Frisco, TX (US)

(72) Inventor: William J. Warren, Frisco, TX (US)

( * ) Notice: Subject to any disclaimer, the term of this patent is extended or adjusted under 35 U.S.C. 154(b) by 0 days.

(21) Appl. No.: 15/788,708

(22) Filed: Oct. 19, 2017

(65) Prior Publication Data

US 2018/0248391 A1    Aug. 30, 2018

Related U.S. Application Data

(63) Continuation-in-part of application No. 15/697,307, filed on Sep. 6, 2017, now Pat. No. 9,997,882.

(60) Provisional application No. 62/473,225, filed on Mar. 17, 2017, provisional application No. 62/466,576, filed on Mar. 3, 2017, provisional application No. 62/465,871, filed on Mar. 2, 2017, provisional application No. 62/465,705, filed on Mar. 1, 2017, provisional application No. 62/464,517, filed on Feb. 28, 2017, provisional application No. 62/464,077, filed on Feb. 27, 2017, provisional application No. 62/467,230, filed on Mar. 5, 2017.

(51) Int. Cl.
*H02J 7/00* (2006.01)
*H02J 7/02* (2016.01)

(52) U.S. Cl.
CPC .......... *H02J 7/0044* (2013.01); *H02J 7/0045* (2013.01); *H02J 7/02* (2013.01); *H02J 2007/0062* (2013.01)

(58) Field of Classification Search
CPC ........... H02J 7/0044; H02J 7/0045; H02J 7/02
USPC ....................................................... 439/638
See application file for complete search history.

(56) References Cited

U.S. PATENT DOCUMENTS

| 2,392,445 | A | | 1/1946 | Anderson |
| 4,536,694 | A | | 8/1985 | McCarty et al. |
| 5,187,744 | A | * | 2/1993 | Richter ............... B60R 11/0241 |
| | | | | 224/553 |
| D343,107 | S | | 1/1994 | Fulton |
| 5,305,381 | A | | 4/1994 | Wang et al. |
| 5,587,645 | A | | 12/1996 | Sciammarella et al. |
| 5,648,712 | A | | 7/1997 | Hahn |
| 5,679,017 | A | | 10/1997 | Smith |
| 5,762,512 | A | | 6/1998 | Trant et al. |
| 5,903,645 | A | * | 5/1999 | Tsay .................... B60R 11/0241 |
| | | | | 248/316.4 |

(Continued)

FOREIGN PATENT DOCUMENTS

| EP | 2228263 A1 | 9/2010 |
| WO | WO2016003585 A1 | 1/2016 |

OTHER PUBLICATIONS

International Search Report and Written Opinion dated Sep. 4, 2015 for Patent Cooperation Treaty Application PCT/US2015/034073, filed Jun. 3, 2015, 8 pages.

*Primary Examiner* — Alexander Gilman
(74) *Attorney, Agent, or Firm* — Carr & Ferrell LLP (57) ABSTRACT

Electrical charging devices and assemblies are provided herein. An example apparatus includes an electronics tray including a forwardly disposed locking platform, an electronics assembly in sliding relationship with the electronics tray, the electronics assembly having locking members that mate with the forwardly disposed locking platform when the electronics assembly is translated forwardly, and a stabilizer that pivots downwardly when the electronics assembly is translated forwardly.

18 Claims, 4 Drawing Sheets

(56) References Cited

U.S. PATENT DOCUMENTS

| | | | |
|---|---|---|---|
| 6,029,215 A | 2/2000 | Watts, Jr. et al. | |
| 6,091,611 A | 7/2000 | Lanni | |
| 6,341,218 B1 | 1/2002 | Poplawsky et al. | |
| 6,510,067 B1 | 1/2003 | Toebes | |
| 6,518,724 B2 | 2/2003 | Janik | |
| 6,831,848 B2 | 12/2004 | Lanni | |
| 6,848,802 B2 | 2/2005 | Chen | |
| 6,861,822 B2 | 3/2005 | Wei | |
| 6,938,867 B2 | 9/2005 | Dirks | |
| 7,066,767 B2 | 6/2006 | Liao | |
| 7,075,779 B2 | 7/2006 | Bothe et al. | |
| 7,166,987 B2 | 1/2007 | Lee et al. | |
| 7,254,424 B1 | 8/2007 | Reichert | |
| D573,866 S | 7/2008 | Smith | |
| 7,524,197 B2 | 4/2009 | Mills et al. | |
| 7,528,323 B2 | 5/2009 | Wu et al. | |
| 7,540,748 B2 | 6/2009 | Tracy et al. | |
| 7,551,458 B2 * | 6/2009 | Carnevali | B60R 11/0252 174/520 |
| 7,623,182 B2 | 11/2009 | Byrne et al. | |
| 7,654,855 B2 | 2/2010 | Liao | |
| 7,682,185 B2 | 3/2010 | Liao | |
| 7,699,664 B2 | 4/2010 | Kim et al. | |
| D617,863 S | 6/2010 | Moody et al. | |
| D626,671 S | 11/2010 | Bertken | |
| 7,850,484 B2 | 12/2010 | Hayashi et al. | |
| 7,857,659 B2 | 12/2010 | Wang et al. | |
| 7,887,341 B2 | 2/2011 | Liao | |
| D638,560 S | 5/2011 | Seenstra | |
| 8,113,873 B1 | 2/2012 | Sarraf | |
| 8,224,408 B2 | 7/2012 | Tomasini et al. | |
| D676,380 S | 2/2013 | Sun | |
| 8,367,235 B2 | 2/2013 | Huang | |
| D680,941 S | 4/2013 | Deppen | |
| 8,414,318 B1 | 4/2013 | Chen | |
| 8,415,920 B2 | 4/2013 | Liao | |
| D687,375 S | 8/2013 | Franco | |
| 8,616,327 B1 * | 12/2013 | Palacios | H04M 1/035 181/175 |
| 8,686,683 B2 | 4/2014 | Caskey et al. | |
| 8,712,482 B2 | 4/2014 | Sorias et al. | |
| 8,794,997 B2 | 8/2014 | Tin | |
| 8,805,640 B2 | 8/2014 | Nielsen et al. | |
| 8,864,517 B2 | 10/2014 | Cohen | |
| D719,008 S | 12/2014 | Han | |
| D723,457 S | 3/2015 | Sorias | |
| 9,027,486 B1 * | 5/2015 | Berkovitz | B60N 3/002 108/40 |
| 9,130,332 B2 | 9/2015 | Yosef | |
| 9,161,464 B2 | 10/2015 | Liao | |
| D745,628 S | 12/2015 | Barfoot et al. | |
| D748,834 S | 2/2016 | Huang | |
| 9,310,841 B2 | 4/2016 | Williams | |
| 9,356,454 B2 | 5/2016 | Caren et al. | |
| D760,647 S | 7/2016 | Chen | |
| D762,169 S | 7/2016 | Lei | |
| 9,429,994 B1 | 8/2016 | Vier | |
| 9,473,607 B2 | 10/2016 | An | |
| D774,377 S | 12/2016 | Hilliaho | |
| D775,752 S | 1/2017 | Nook et al. | |
| D778,706 S | 2/2017 | Atkins | |
| 9,568,148 B2 * | 2/2017 | Carnevali | B60R 11/0241 |
| D783,526 S | 4/2017 | Warren | |
| 9,620,911 B2 * | 4/2017 | Warren | H01R 13/6675 |
| 9,627,802 B2 | 4/2017 | Warren | |
| D791,070 S | 7/2017 | Son | |
| D791,076 S | 7/2017 | Kim | |
| D791,697 S | 7/2017 | Precheur | |
| D792,752 S | 7/2017 | Chung et al. | |
| D792,995 S | 7/2017 | Colasse | |
| D795,190 S | 8/2017 | Tzeng | |
| 9,742,107 B2 | 8/2017 | Choi et al. | |
| 9,812,811 B1 | 11/2017 | Gorin et al. | |
| 9,904,327 B2 * | 2/2018 | Whitt, III | G06F 1/166 |
| D813,339 S | 3/2018 | Maroney | |
| D813,658 S | 3/2018 | Wright | |
| D814,264 S | 4/2018 | Werdowatz | |
| D818,167 S | 5/2018 | Molnar | |
| 9,997,882 B1 | 6/2018 | Warren | |
| D822,598 S | 7/2018 | Warren | |
| D823,513 S | 7/2018 | Olcoz et al. | |
| 10,027,149 B2 | 7/2018 | Warren | |
| 10,063,088 B2 | 8/2018 | Warren | |
| D828,938 S | 9/2018 | Hou | |
| D829,651 S | 10/2018 | Warren | |
| 2002/0149695 A1 | 10/2002 | Kayanuma | |
| 2003/0218445 A1 | 11/2003 | Behar | |
| 2004/0105024 A1 | 6/2004 | Takahashi | |
| 2004/0251873 A1 | 12/2004 | Simoes et al. | |
| 2005/0178633 A1 | 8/2005 | Liao | |
| 2006/0105819 A1 | 5/2006 | Liao | |
| 2006/0194467 A1 | 8/2006 | Beasley et al. | |
| 2007/0034753 A1 * | 2/2007 | Lee | B60R 11/0241 248/121 |
| 2007/0258204 A1 | 11/2007 | Chang et al. | |
| 2008/0157715 A1 | 7/2008 | Rosenboom et al. | |
| 2008/0227380 A1 | 9/2008 | Hsu et al. | |
| 2009/0047827 A1 | 2/2009 | Liao | |
| 2011/0031287 A1 * | 2/2011 | Le Gette | F16M 11/04 224/101 |
| 2012/0049800 A1 | 3/2012 | Johnson et al. | |
| 2012/0077361 A1 | 3/2012 | Youssefi-Shams et al. | |
| 2012/0178506 A1 | 7/2012 | Sorias et al. | |
| 2012/0214348 A1 | 8/2012 | Youssefi-Shams et al. | |
| 2013/0057215 A1 | 3/2013 | Rajeswaran et al. | |
| 2013/0093220 A1 | 4/2013 | Pajic | |
| 2013/0150134 A1 | 6/2013 | Pliner et al. | |
| 2013/0178252 A1 * | 7/2013 | Sorias | H02J 7/0042 455/573 |
| 2013/0242495 A1 * | 9/2013 | Bathiche | G06F 1/1626 361/679.28 |
| 2014/0030912 A1 | 1/2014 | Cohen | |
| 2014/0085814 A1 * | 3/2014 | Kielland | A45F 3/02 361/679.55 |
| 2014/0139989 A1 * | 5/2014 | Mori | G06F 1/1628 361/679.09 |
| 2015/0011265 A1 | 1/2015 | Walsh, Jr. | |
| 2015/0015204 A1 | 1/2015 | Sorias et al. | |
| 2015/0207286 A1 | 7/2015 | Chen et al. | |
| 2015/0207350 A1 | 7/2015 | Chen et al. | |
| 2015/0234108 A1 * | 8/2015 | Harley, Jr. | G02B 6/005 362/606 |
| 2015/0234478 A1 * | 8/2015 | Belesiu | G06F 1/1618 345/168 |
| 2015/0263447 A1 | 9/2015 | Liao | |
| 2015/0268699 A1 * | 9/2015 | Bathiche | G06F 1/1649 345/1.3 |
| 2015/0380872 A1 * | 12/2015 | Warren | H01R 13/6675 439/529 |
| 2016/0039525 A1 | 2/2016 | Pajic | |
| 2016/0087381 A1 | 3/2016 | Wong et al. | |
| 2016/0090767 A1 * | 3/2016 | Park | E05D 11/10 16/319 |
| 2016/0118758 A1 | 4/2016 | Cymerman | |
| 2016/0141815 A1 * | 5/2016 | Warren | H01R 13/60 439/529 |
| 2016/0204816 A1 | 7/2016 | Abramovich | |
| 2016/0209885 A1 | 7/2016 | Ellis | |
| 2016/0218536 A1 | 7/2016 | Caren et al. | |
| 2016/0261129 A1 | 9/2016 | Warren | |
| 2016/0380457 A1 | 12/2016 | Criss | |
| 2017/0005496 A1 | 1/2017 | Warren | |
| 2017/0012450 A1 | 1/2017 | Warren | |
| 2017/0101256 A1 | 4/2017 | Zeitlin | |
| 2017/0163080 A1 | 6/2017 | Warren | |
| 2018/0248321 A1 | 8/2018 | Warren | |
| 2018/0248392 A1 | 8/2018 | Warren | |

\* cited by examiner

ELECTRICAL CHARGING DEVICES AND ASSEMBLIES

CROSS-REFERENCE TO RELATED APPLICATIONS

The present application is a Continuation-in-Part Application of U.S. patent application Ser. No. 15/697,307, filed on Sep. 6, 2017, which claims the benefit of U.S. Provisional Application No. 62/464,077, filed on Feb. 27, 2017, of U.S. Provisional Application No. 62/464,517, filed on Feb. 28, 2017, of U.S. Provisional Application No. 62/465,705, filed on Mar. 1, 2017, of U.S. Provisional Application No. 62/465,871, filed on Mar. 2, 2017, of U.S. Provisional Application No. 62/466,576, filed on Mar. 3, 2017, and of U.S. Provisional Application No. 62/473,225, filed on Mar. 17, 2017; this application also claims the benefit of U.S. Provisional Application No. 62/467,230, filed on Mar. 5, 2017. All of these applications are hereby incorporated by reference herein in their entireties, including all references cited therein.

FIELD

The present technology pertains to devices for electronic charging, and more specifically, but not by way of limitation, to electronic charging stations that couple with a wall outlet, as well as receive and retain an electronic device such as a Smartphone, tablet, laptop, and so forth, during charging.

SUMMARY

Various embodiments of the present disclosure are directed to an apparatus, including: (a) an electronics tray comprising: (1) a sidewall defining a recess that receives an interchangeable electronics assembly; and (2) a locking platform extending from a front edge of the recess, the locking platform comprising one or more receiver grooves; (b) the interchangeable electronics assembly comprising electrical conductors, the interchangeable electronics assembly comprising a lower surface that comprises one or more protrusions that are extendable from the lower surface; and (c) wherein when the interchangeable electronics assembly is translated from a stored position to a deployed position, the one or more protrusions enter into the one or more receiver grooves to lock the interchangeable electronics assembly in place.

Various embodiments of the present disclosure are directed to an apparatus, including: (a) an electronics tray comprising: (1) a partially enclosed sidewall defining a recess that receives an electronics assembly; and (2) a locking platform extending from a front edge of the recess, the locking platform comprising one or more receiver grooves; (b) means for electrically coupling an electronics assembly with an electronic device; (c) the electronics assembly comprising: (1) a housing having a lower surface that comprises one or more protrusions extending from the lower surface; (2) electrical conductors; and (3) a circuit disposed within the housing that converts power received from an outlet for use in charging the electronic device; and (d) wherein when the electronics assembly is translated from a stored position to a deployed position when coupled with the electronics tray, the one or more protrusions enter into the one or more receiver grooves to lock the electronics assembly in place.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity, at least as described herein, in any manner, irrespective of the at least one entity have any relationship to the subject matter of the present disclosure.

Generally described, the present technology involves devices that are used to charge electronic devices. Example types of electronic devices that can be charged using the present technology include, but are not limited to, cellular telephones, Smartphones, PDAs, tablets, phablets, laptops, or any other mobile electronic device that requires recharging through an electrical interface or charging port.

FIGS. 1-4 collectively illustrate an example charging apparatus 100. The apparatus 100 generally comprises a cradle 102, an electronics tray 104, and an electronics assembly 106. Generally, the apparatus 100 is configured to receive and retain an electronic device 108, such as a phone, tablet, laptop, and so forth. The electronic device 108 can be charged through a means for connecting the electronics assembly 106 with the electronic device 108, such as a cable 107 that interfaces with a charging port of the electronic device 108.

Figure 4:
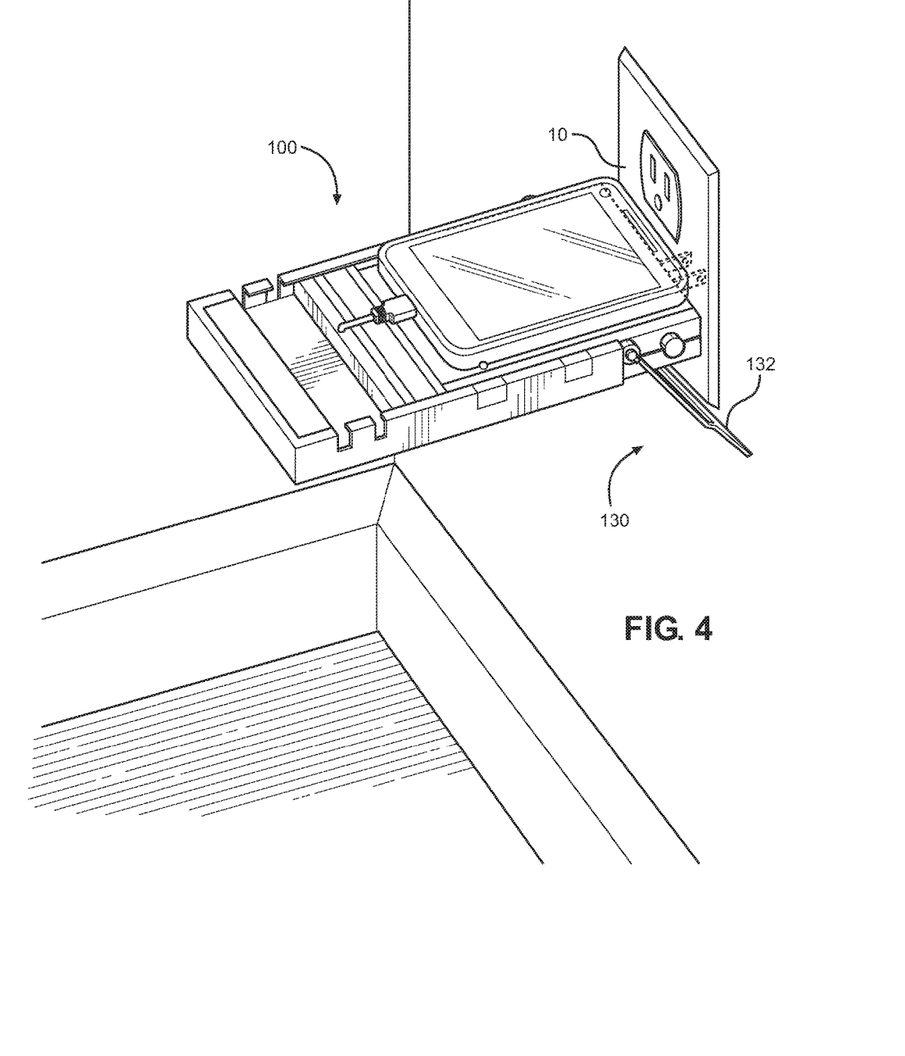
FIG. 4 is a perspective view of the example apparatus of FIG. 1 in use.

When the electronics assembly 106 is coupled to a power source, such as a wall outlet 10 as in FIG. 4 (could be either alternating current or direct current), for example, the electronics assembly 106 can convert or otherwise condition the electrical energy into a format that can be used by the electronic device 108. Additional details on these features are described in greater detail herein.

The cradle 102 can couple with or be integral with the electronics assembly 106 in some embodiments. The cradle 102 comprises retaining features that allow the electronic device 108 to be retained therein. For example, overlapping flexible corner tabs such as tab 110 can be utilized.

In some embodiments, the cradle 102 is eliminated and the electronic device 108 can rest on top of a housing 112 of the electronics assembly 106. In one embodiment, the housing 112 of the electronics assembly 106 incorporates a wireless charging interface (e.g., inductive charging). The electronic device 108 is charged when resting on the housing 112.

In various embodiments, the electronics assembly 106 can be an inductive charging base. The inductive charging base can include at least one primary (induction) coil (also known as a sender coil), a battery, and a charging interface. The primary coil can produce an alternating electromagnetic field (or inductive field) within the inductive charging base. The electromagnetic field can be used to charge one or more electronic devices, such as electronic device 108. The electronic device 108 can have at least one secondary (induction) coil (also known as a receiver coil) that can receive power from the electromagnetic field and convert the power into electric current that may be used to charge the battery of electronic device 108. When the primary coil in the inductive charging base and the secondary coil in the electronic device 108 are in close proximity, the two induction coils combine to form an electrical transformer.

In some embodiments, the electronics assembly 106 can include one or more batteries. The one or more batteries may be non-rechargeable batteries (such as alkaline cells, lithium cells, carbon-zinc cells, silver-oxide cells, zinc air cells, and the like), rechargeable batteries (such as lithium-ion, nickel cadmium, nickel metal hydride, lead acid batteries, and the like), or a combination of non-rechargeable and rechargeable batteries, according to various embodiments.

In other embodiments, an upper surface of the housing 112 can comprise a gripping layer or coating that helps secure the electronic device 108 in place.

In various embodiments, the electronics assembly 106 can comprise a printed circuit board with various permutations of electrical components. In general, the electronics assembly 106 is configured to transform the AC power waveform received from an outlet into DC power that is appropriate for charging the electronic device 108.

In some embodiments, the electronics assembly 106 can include combinations of electrolytic capacitors, MOSFET switching transistors, flyback transformers, a controller integrated circuit, capacitors, diodes, R-C snubber circuits, EMI (electromagnetic interference) circuits, inductors, control chips, Schottky diodes, Tantalum filter capacitors, as well as any combinations thereof, in order to provide the desired transformation of AC to DC functions.

In other embodiments, the electronics assembly 106 is an advanced flyback switching power supply that receives the AC voltage in ranges of 100 to 240 volts, and produces approximately five watts of smooth voltage power. AC line power is converted to high voltage DC current using a diode bridge. The DC power is switched off and on by a transistor controlled by a power supply controller IC.

In some embodiments, the chopped DC power supply is fed back into a flyback transformer, which converts the DC power to a low voltage AC waveform. The AC waveform is then converted into DC, which is filtered with a filter to obtain smooth power that is substantially free of interference. The electronics assembly 106 can comprise a feedback circuit that measures the voltage output to the electrical connector (e.g., prongs or USB, for example) and sends a signal to the controller IC, which adjusts the switching frequency to obtain a desired voltage. One of skill in the art will appreciate that other charging interfaces such as USB connectors or even inductive charging interfaces can be utilize in place of the prongs.

In various embodiments, the electronics assembly 106 is interchangeable. For example, an electronics assembly 106 can comprise a circuit that is configured to convert AC to DC power. In another, the circuit is configured to transform or step down a DC input at a first power level to a second power level that is usable for the electronic device. This allows the electronics assembly 106 to be switched out per the requirements of the electronic device and/or the power source available at the moment.

The electronics assembly 106 can be removed and replaced with an electronics assembly having different components in other embodiments. This allows for selection of an appropriate electronics assembly based on the charging requirements of the electronic device. For example, a laptop requires different charging power than a Smartphone. A corresponding electronics assembly can be selected for each of these devices, although a shape and size of each of these electronics assemblies is similar to allow the various electronics assemblies to cooperate with the electronics tray 104.

In some embodiments, the electronics assembly 106 comprises one or more lateral protrusions, such as a wheel 114 that extend from a side of the housing 112. In some embodiments, wheels are disposed into notches, such as notch 111 (see FIG. 3) fabricated into a lower side/underside of the housing 112. The wheels extend from the sides of the housing 112 and translate along a sidewall of the electronics tray 104, as will be discussed in greater detail below.

Figure 1:
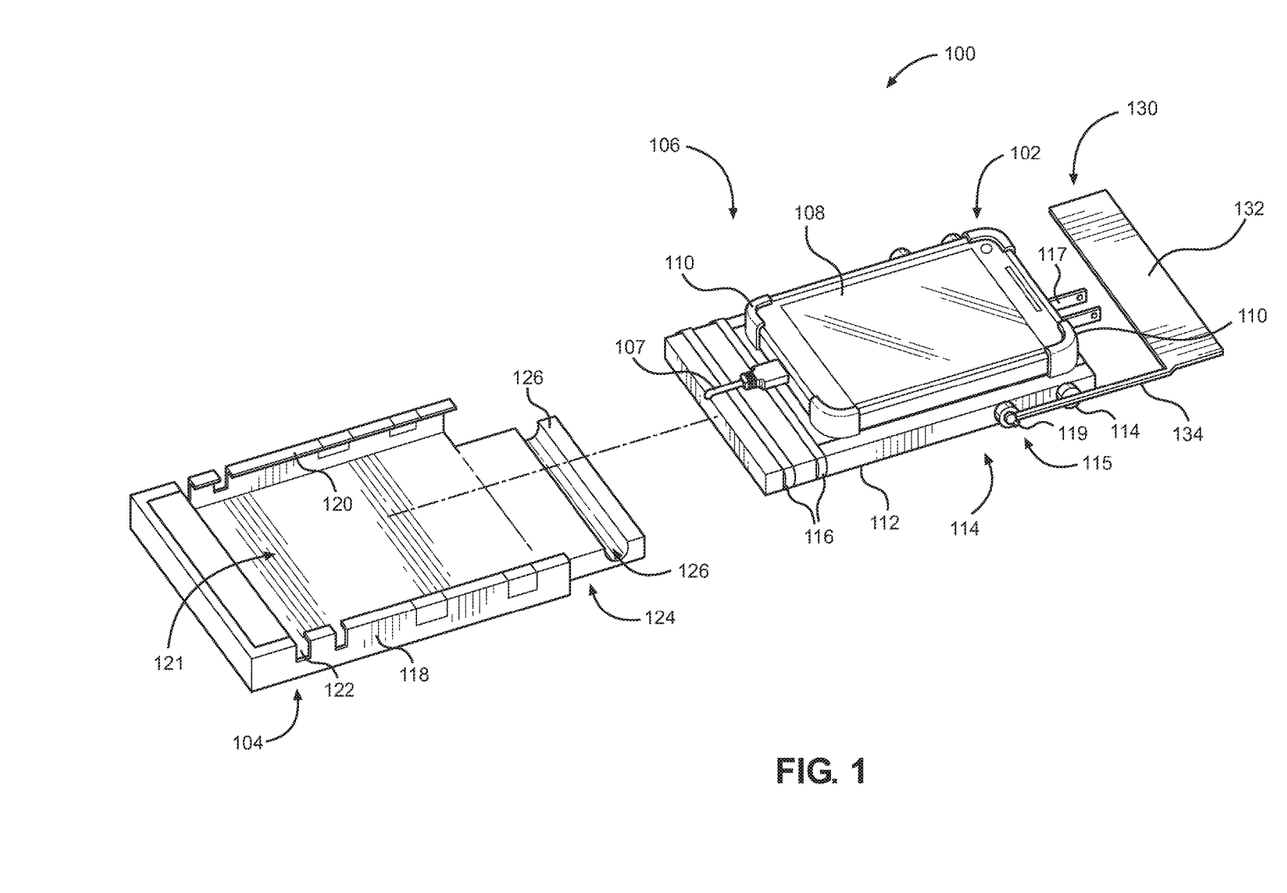
FIG. 1 is a perspective view of an example apparatus of the present technology.
Figure 2:
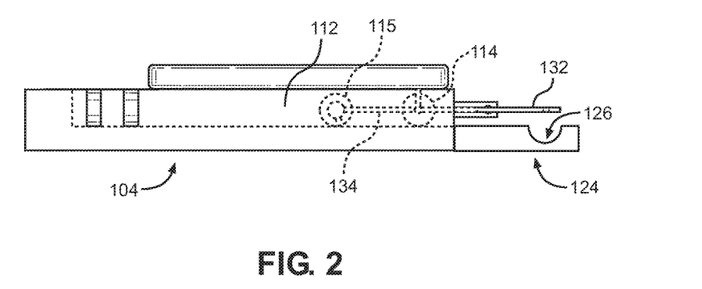
FIG. 2 is a side view of the example apparatus of FIG. 1 with an electronics tray disposed in a stored configuration.
Figure 3:
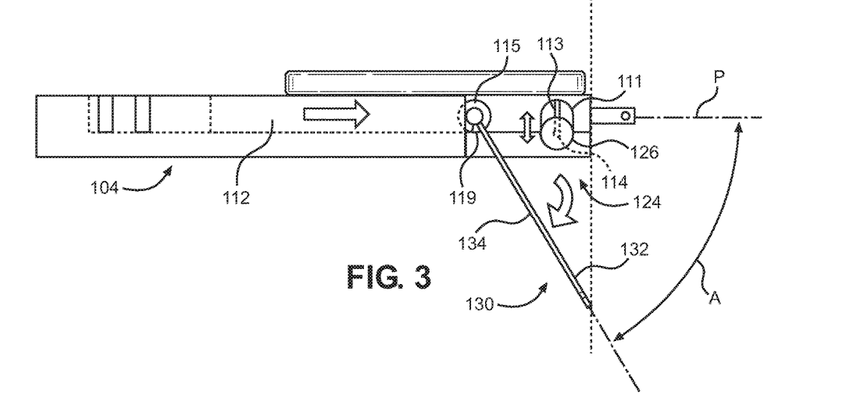
FIG. 3 is a side view of the example apparatus of FIG. 1 with an electronics tray disposed in a deployed configuration.

In other embodiments, as in FIGS. 2 and 3, the wheels function as a detent. For example, the wheel 114 functions as a locking member or protrusion that will interface with receiver grooves of the electronics tray 104, as will be described below. A locking actuator 113 can comprise a shaft that extends from one wheel to an opposing wheel on the other side of the electronics assembly 106. In some embodiments, the locking actuator 113 can resiliently distend/extend and retract the wheel 114 into the notch 111 during use, as will be described in greater detail below.

In sum, the electronics assembly 106 comprises both lateral protrusions that engage with a sidewall of the electronics assembly 106 (rear wheels) and additional protrusions (forward wheels, such as wheel 114) that are capable of extending from and retracting into a bottom/lower surface of the housing 112 of the electronics assembly 106.

According to some embodiments, the housing 112 can comprise securement members, such as securement member 116 that are positioned towards a rear or back section of the housing 112. The securement member 116 cooperates with securement members on the electronics tray 104 to provide a means for securing the electronics assembly 106 with the electronics assembly 106 when in the stored position. To be sure, the stored position is when the electronics tray 104 is fully inserted into the electronics assembly 106. The respective securement members engage thereby securing the electronics tray 104 and the electronics assembly 106 together. Manual force exerted by a user to translate the electronics assembly 106 linearly out of the electronics tray 104 will overcome the engagement, allowing for disengagement of the securement members, when desired.

In some embodiments, the securement member 116 can comprise, for example, a magnet or a hemispherical protrusion.

In various embodiments, one of the wheels, such as wheel 115, comprises a stop 119 that is set at a radial position along the wheel 114. The use and description of the stop 119 is provided below with reference to the descriptions of a stabilizer.

The electronics assembly 106 can comprise an electrical interface or conductor 117, such as outlet prongs, USB connector, or other similar interface that allows for the communication of electrical energy into the circuit of the electronics assembly 106. In some embodiments, the conductor 117 extends from the front of the housing 112.

The electronics assembly 106 is securely housed or held within the electronics tray 104. The electronics tray 104 can comprise a sidewall 118 that extends around a back side and along lateral sides thereof.

In order to help retain the electronics assembly 106, the sidewall 118 comprises orthogonally extending cover members, such as cover member 120. The cover members 120 are orthogonal to the sidewall 118 and extend inwardly towards one another. This creates a partial enclosure and recess 121, structurally and functionally a sleeve that receives the electronics assembly 106.

The cover members 120 and sidewall 118 also create rails or tracks that receive the wheels (such as wheel 114) and allow for translation of the electronics assembly 106 relative to the electronics tray 104.

The partial enclosure secures the electronics assembly 106 by covering at least a portion of an upper surface of the electronics assembly 106 preventing unintentional upward movement of the electronics assembly 106 away from the electronics tray 104.

In various embodiments, the sidewall 118 of the electronics tray 104 comprises notches or grooves, such as notch 122 located proximally from a front of the electronics tray 104. The notches cooperate with the securement member(s) 116 of the electronics assembly 106, providing the aforementioned functionalities of securement when the apparatus 100 is in the stored configuration.

In accordance with the present disclosure, the electronics tray 104 can comprise a locking platform 124 that extends distally from a front of the electronics tray 104. In more detail, the locking platform 124 extends from a front edge of the recess 121.

In some embodiments, the locking platform 124 is an extension that comprises one or more receiver grooves, such as receiver groove 126. A size and shape of the receiver groove 126 corresponds to a size and shape of the wheel 114 described above. When the electronics assembly 106 is translated forwardly, the wheel 114 described above will drop into the receiver groove 126, thereby securing the electronics assembly 106 in a deployed position. An opposing wheel (not shown) on an opposing side of the electronics tray 104 will also fall into this groove 126, in some embodiments. Pushing backwardly on the electronics assembly 106 causes the wheel 114 to retract back into its respective groove within the electronics assembly 106.

The apparatus 100 can comprise a stabilizer 130 that is configured to support a portion of the weight of the apparatus 100, as well as any electronic device supported thereon. In some embodiments, the stabilizer 130 comprises a flat support member 132 coupled to the wheel 115 (e.g., protrusion/locking member) of the electronics assembly 106 using an armature 134. That is, the flat support member 132 pivots about the front of the apparatus 100 as the armature 134 rotates at its connection to the wheel 115. In some embodiments, the stabilizer 130 extends from a front edge of the electronics assembly 106 when the electronics assembly 106 is in the deployed position.

In some embodiments, rotation of the flat support member 132 is limited by the stop 119 associated with the wheel 115. This movement allows the stabilizer 130 to be disposed at an angle A relative to the electronics assembly 106 so as to support the apparatus 100 when coupled with an outlet, such as a wall outlet 10 illustrated in FIG. 4. Again, the stop 119 is disposed at a radial position on the wheel 115 that allows the stabilizer 130 to limit rotation so as to stop at the angle A. The angle A can be set to any angle desired. In some embodiments, the angle is measured between the flat support member 132 and a reference plane P extending through the housing 112 of the electronics assembly 106.

Figure 5:
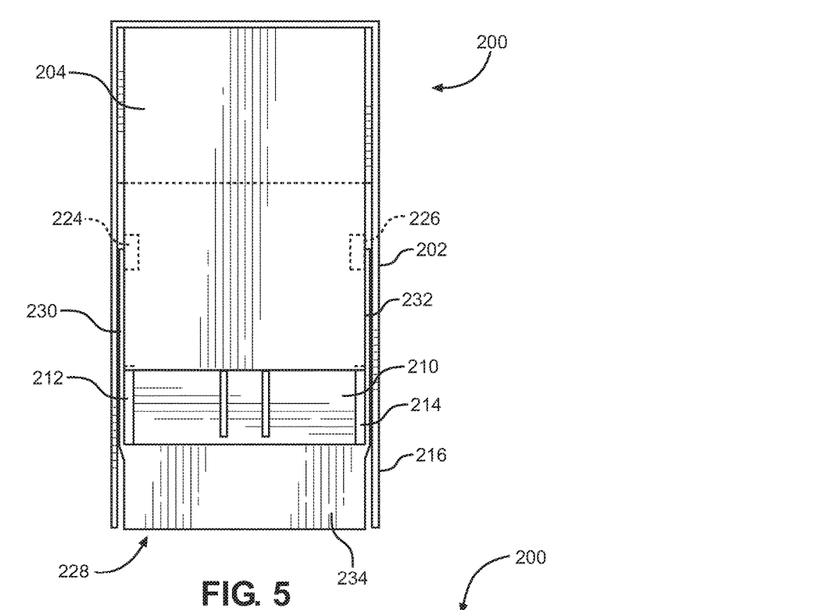
FIG. 5 is a top down view of another example apparatus constructed in accordance with the present disclosure.
Figure 6A:
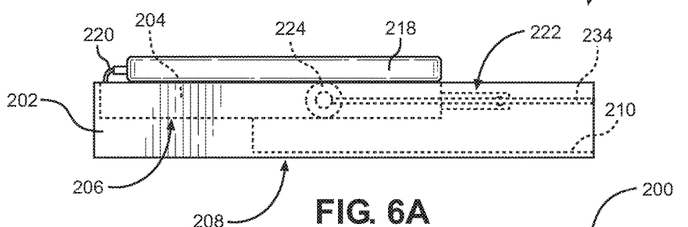
FIG. 6A is a side view of the example apparatus of FIG. 5 with an electronics tray disposed in a stored configuration.
Figure 6B:
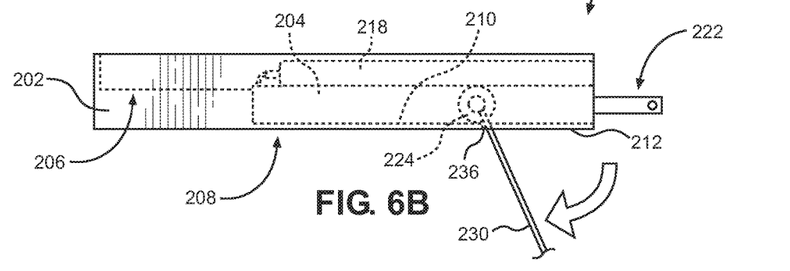
FIG. 6B is a side view of the example apparatus of FIG. 5 with an electronics tray disposed in a deployed configuration.

FIGS. 5-6B collectively illustrate another example apparatus 200. The apparatus 200 comprises an electronics tray 202 and an electronics assembly 204.

The electronics tray 202 is a tiered member having a first tier 206 and a second tier 208. When the electronics assembly 204 is in a stored configuration, the electronics assembly 204 is positioned on top of the first tier 206, as in FIG. 6A. When the electronics assembly 204 is in a deployed configuration, the electronics assembly 204 slides forwardly within the electronics tray 202 and drops down into the second tier 208, locking the electronics tray 202 in place within the electronics assembly 204. In some embodiments, the second tier 208 is defined by a supporting surface 210 that comprises grooves 212 and 214 that are near a sidewall 216 of the electronics tray 202. The grooves 212 and 214 provide a pathway for armatures of a stabilizer to pass through for deployment, as will be described in greater detail below.

In some embodiments, the electronics assembly 204 provides an enclosure that retains electronic components of the apparatus 200 that converts electrical energy into a form that is usable by an electronic device 218 that is supported by the electronics assembly 204. In some embodiments, the electronic device 218 is coupled with the electronics assembly 204 by a wired connection 220.

As noted above, the electronics assembly 204 is an interchangeable component. The electronics assembly 204 can be selected based on the charging needs of the e electronic device being charged. For example, some electronics devices require different power profiles for charging. Thus, the electronics assembly 204 can be removed and/or replaced as needed. The electronics assembly 204 comprises a charging interface 222, which in this instance comprises electrical prongs. One of skill in the art will appreciate that other charging interfaces such as USB connectors or even inductive charging interfaces can be utilize in place of the prongs.

In various embodiments, the electronics assembly 204 comprises wheels 224 and 226. The electronics assembly 204 can slidably translate in the electronics tray 202 on the wheels 224 and 226. As the wheels rotate, a stabilizer 228 will rotate downwardly through the grooves 212 and 214 in the second tier 208 of the electronics tray 202. In more detail, the stabilizer 228 comprises armature 230 and armature 232, which are coupled with a stabilizer body 234. As the electronics assembly 204 is translated forwardly and drops from the first tier 206 to the second tier 208, the wheels 224 and 226 rotate. The rotation of the wheels 224 and 226 causes the armatures 230 and 232 to pivot about their connection to the wheels 224 and 226, resulting in the stabilizer body 234 rotating downwardly. It will be understood that the stabilizer body 234 supports the apparatus 200 when the charging interface 222 engages with a charging port (as with the apparatus 100 of FIG. 4). The rotation of the armatures 230 and 232 are limited by back edges of the grooves 212 and 214. For example, when in the fully deployed position, as in FIG. 6B, the armature 230 contacts a back edge 236 of the groove 212. Thus, the length of the grooves determines where the stabilizer body is positioned relative to a plane P that is parallel with the apparatus 200.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. An apparatus, comprising:
   an electronics tray comprising:
      a sidewall defining a recess that receives an interchangeable electronics assembly;
      a locking platform extending from a front edge of the recess, the locking platform comprising one or more receiver grooves; and
      a stabilizer extending from a front edge of the interchangeable electronics assembly when the interchangeable electronics assembly is in a deployed position;
   the interchangeable electronics assembly comprising electrical conductors, the interchangeable electronics assembly comprising a lower surface that comprises one or more protrusions that are extendable from the lower surface, the stabilizer being pivotally coupled to at least one of the one or more protrusions so as to be disposed at an angle relative to the interchangeable electronics assembly; and
   wherein when the interchangeable electronics assembly is translated from a stored position to the deployed position, the one or more protrusions enter into the one or more receiver grooves to lock the interchangeable electronics assembly in place.

2. The apparatus according to claim 1, wherein the stabilizer being disposed at the angle relative to the interchangeable electronics assembly supports the apparatus when coupled with an outlet.

3. The apparatus according to claim 2, wherein the stabilizer extends from a front edge of the interchangeable electronics assembly when the interchangeable electronics assembly is in the deployed position.

4. The apparatus according to claim 1, wherein the at least one of the one or more protrusions comprises a stop disposed at a radial position that allows the stabilizer to limit rotation to the angle.

5. The apparatus according to claim 1, further comprising grooves in the sidewall of the electronics tray that receive lateral protrusions extending from the interchangeable electronics assembly, wherein the lateral protrusions lock into the grooves when the interchangeable electronics assembly is in the stored position.

6. The apparatus according to claim 1, wherein the sidewall comprises orthogonally extending cover members that secure the interchangeable electronics assembly by covering at least a portion of an upper surface of the interchangeable electronics assembly.

7. The apparatus according to claim 1, further comprising a cradle configured to receive and retain an electronic device.

8. The apparatus according to claim 7, wherein the interchangeable electronics assembly is coupled with the cradle.

9. The apparatus according to claim 8, further comprising a means for electrically coupling the interchangeable electronics assembly with the electronic device.

10. An apparatus, comprising:
an electronics tray comprising:
a partially enclosed sidewall defining a recess that receives an electronics assembly; and
a locking platform extending from a front edge of the recess, the locking platform comprising one or more receiver grooves;
means for electrically coupling an electronics assembly with an electronic device;
the electronics assembly comprising:
a housing having a lower surface that comprises one or more protrusions extending from the lower surface;
electrical conductors; and
a circuit disposed within the housing that converts power received from an outlet for use in charging the electronic device; and
wherein when the electronics assembly is translated from a stored position to a deployed position when coupled with the electronics tray, the one or more protrusions enter into the one or more receiver grooves to lock the electronics assembly in place.

11. The apparatus according to claim 10, further comprising a stabilizer, the stabilizer being disposed at an angle relative to the electronics assembly so as to support the apparatus when coupled with an outlet.

12. The apparatus according to claim 11, wherein the stabilizer extends from a front edge of the interchangeable electronics assembly when the electronics assembly is in the deployed position.

13. The apparatus according to claim 12, wherein the stabilizer is pivotally coupled to at least one of the one or more protrusions so as to be disposed at the angle.

14. The apparatus according to claim 13, wherein the at least one of the one or more protrusions comprises a stop disposed at a radial position that allows the stabilizer to limit rotation to the angle.

15. An apparatus, comprising:
an electronics tray comprising a forwardly disposed locking platform;
an electronics assembly in sliding relationship with the electronics tray, the electronics assembly comprising locking members that mate with the forwardly disposed locking platform when the electronics assembly is translated forwardly; and
a stabilizer that pivots downwardly when the electronics assembly is translated forwardly.

16. The apparatus according to claim 15, wherein the electronics assembly comprises:
an electrical conductor that mates with a power source; and
a circuit that converts power received from the power source into a format that can be utilized by an electrical device coupled with the electronics assembly.

17. The apparatus according to claim 16, wherein the electrical device is coupled with the electronics assembly using a wire or cable.

18. The apparatus according to claim 15, wherein the locking members resiliently extend and retract from a lower end of the electronics tray, further wherein the locking members are positioned in a retracted position when the electronics tray is in a stored position and the locking members are positioned in an extended position when the electronics tray is in a deployed position.

* * * * *